US010806295B2

(12) United States Patent
Santini et al.

(10) Patent No.: US 10,806,295 B2
(45) Date of Patent: Oct. 20, 2020

(54) DESCALING HOT-BEVERAGE PRODUCING MACHINES

(71) Applicant: KONINKLIJKE PHILIPS N.V., Eindhoven (NL)

(72) Inventors: Marco Santini, Eindhoven (NL); Giovanni Berto, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 312 days.

(21) Appl. No.: 15/028,462

(22) PCT Filed: Oct. 22, 2014

(86) PCT No.: PCT/EP2014/072691
§ 371 (c)(1),
(2) Date: Apr. 11, 2016

(87) PCT Pub. No.: WO2015/059213
PCT Pub. Date: Apr. 30, 2015

(65) Prior Publication Data
US 2016/0249767 A1 Sep. 1, 2016

(30) Foreign Application Priority Data

Oct. 22, 2013 (EP) .................... 13189718

(51) Int. Cl.
A47J 31/60 (2006.01)
C02F 5/02 (2006.01)
B08B 9/032 (2006.01)

(52) U.S. Cl.
CPC ............. A47J 31/60 (2013.01); B08B 9/0321 (2013.01); C02F 5/025 (2013.01); C02F 2303/22 (2013.01); C02F 2307/12 (2013.01)

(58) Field of Classification Search
CPC .... A47J 31/60; B08B 9/0321; C02F 2307/12; C02F 2303/22; C02F 5/025
(Continued)

(56) References Cited

U.S. PATENT DOCUMENTS

2014/0348996 A1* 11/2014 Fischer ................... A47J 31/34
426/433
2016/0249767 A1* 9/2016 Santini .................... A47J 31/60
99/290

FOREIGN PATENT DOCUMENTS

CN 1731947 A 2/2006
CN 101340837 A 1/2009
(Continued)

OTHER PUBLICATIONS

Office Action issued in connection with corresponding 201480058328. 7, dated Jun. 1, 2018, 8 pages.
(Continued)

Primary Examiner — Dana Ross
Assistant Examiner — Kuangyue Chen
(74) Attorney, Agent, or Firm — Schott, P.C.

(57) ABSTRACT

A descaling device includes a descaling-chemicals reservoir for descaling a hydraulic circuit of a hot-beverage producing machine. The descaling-chemicals reservoir has an outlet port arranged at or near the bottom portion of the descaling-chemicals reservoir. The descaling device further includes an inlet port and a water flow passage extending from the inlet port to the descaling-chemicals reservoir. The outlet port is provided with a closure member openable upon connection of the descaling device with a hydraulic circuit of a hot-beverage producing machine. The inlet and outlet ports can be placed in fluid communication, such that water (Continued)

is sucked through the inlet port for flow through the descaling-chemicals reservoir and discharge through the outlet port.

17 Claims, 5 Drawing Sheets

(58) Field of Classification Search
USPC .......................................................... 99/290
See application file for complete search history.

(56) References Cited

FOREIGN PATENT DOCUMENTS

| | | | |
|---|---|---|---|
| CN | 101341366 A | | 1/2009 |
| CN | 201371716 Y | * | 12/2009 |
| CN | 101795608 A | | 8/2010 |
| CN | 101980640 A | | 2/2011 |
| CN | 103108579 A | | 5/2013 |
| CN | 202932765 U | | 5/2013 |
| CN | 103249337 A | | 8/2013 |
| CN | 203106791 U | | 8/2013 |
| DE | 3133593 A1 | | 4/1983 |
| DE | 102011054601 A1 | * | 4/2013 .............. A47J 31/34 |
| EP | 2591707 A1 | | 5/2013 |
| EP | 2671480 A2 | | 12/2013 |
| WO | 2009124786 A1 | | 10/2009 |

OTHER PUBLICATIONS

Office Action issued in connection with corresponding 2014338948, dated Jun. 14, 2018, 3 pages.

* cited by examiner

DESCALING HOT-BEVERAGE PRODUCING MACHINES

This application is the U.S. National Phase application under 35 U.S.C. § 371 of International Application No. PCT/EP2014/072691, filed on Oct. 22, 2014, which claims the benefit of International Application No. 13189718.3 filed on Oct. 22, 2013. These applications are hereby incorporated by reference herein.

FIELD OF THE INVENTION

The invention concerns improvements to hot-beverage producing machines and devices for such machines. More specifically, the invention concerns improvements to devices and methods for descaling the hydraulic circuit of hot-beverage producing machines.

BACKGROUND OF THE INVENTION

Hot-beverage producing machines, such as espresso or coffee machines, are widely used household appliances. These machines comprise a water tank and a hydraulic circuit, comprised of a pump and a water heater or boiler. Water pumped from the tank flows through the heater and is heated up to the required temperature for the production of hot-beverage, for example around 90° C. Hot water separates scale, which forms a scale deposit in the water circuit and specifically in the hot section of the circuit, such as the water heater and the ducts and pipes downstream thereof. During use the scale deposit grows on the heating elements of the heater and/or on the water pipes, and will reduce the efficiency of the heater. Internal stresses and heat stresses can cause breaking of the scale and formation of scale particles, which can clog the hydraulic circuit.

Periodical descaling of the hydraulic circuit is therefore required, in order to prevent or limit malfunctioning of these machines. Descaling cycles are usually performed manually by filling the water tank of the hot-beverage producing machine with diluted descaling chemicals. Once the water tank is filled with water-diluted descaling chemicals, the descaling cycle is started. During the descaling cycle the pump of the hydraulic circuit pumps the water-diluted descaling chemicals from the water tank and circulates them through the hydraulic circuit. After flowing through the hydraulic circuit, the water-diluted descaling chemicals and dissolved descaled residues are discharged through the beverage dispensing nozzles, the machine is provided with.

Once the descaling cycle has ended, the water tank must be filled with fresh water. The fresh water is pumped through the hydraulic circuit to was the circuit and remove any residues of the descaling chemicals therefrom. This washing cycle can be performed once or twice, each time filling the water tank again. Washing the hydraulic circuit is necessary, because the descaling chemicals are non-edible and might be hazardous for the human health.

The descaling and subsequent washing cycle require the presence of an operator and lasts a rather long time.

Hot beverage machines also exist, wherein a descaling chemicals container is directly connected to the hydraulic circuit of the machine. Suitably controlled valves are provided for selectively flowing water from a water container through the descaling container, or through a brewing unit, bypassing the descaling chemicals container. During normal operation, water is pumped by the pump of the hydraulic circuit from the water container directly into a water heater and therefrom towards a brewing unit. The descaling chemicals container is bypassed. If the hydraulic circuit requires descaling, the water path is modified by switching suitably arranged valves, such that water is pumped by the pump from the water container through the descaling chemicals container. Descaling chemicals contained in the container are dissolved in water and the descaling solution is circulated in the hydraulic circuit. Once the required amount of descaling solution has been caused to flow through the hydraulic circuit, the valves are switched again to by-pass the descaling chemicals container an fresh water is pumped from the water container directly to and through the water heater.

Machines operating according to this principle are disclosed in DE102011054601 and EP2591707. Furthermore, EP2671480, which falls under Art. 54(3)EPC also discloses a similar method and device.

These known devices and methods require a special design of the hydraulic circuit, with switching valves and control devices for operating the valves, which increases the cost and complexity of the beverage machine.

WO2009/124786 discloses a further device for descaling a hydraulic circuit in a beverage producing machine. The machine includes a water container, a pump, a water heater and a brewing unit. A descaling agent reservoir is arranged in-line, between the water container and the pump. When descaling is required, the operator introduces a water-soluble descaling agent in the reservoir and starts the descaling cycle. Water flows from the water container through the descaling agent reservoir and dissolves the descaling agent. The descaling solution circulates in the hydraulic circuit. This known device is not particularly user-friendly and requires a complex structure of the water container and descaling agent reservoir.

A need therefore exists for an improved descaling process, which make descaling easier, and faster.

SUMMARY OF THE INVENTION

According to one aspect, the invention concerns a method of descaling the hydraulic circuit of a hot-beverage producing machine, such as a coffee or espresso machine, according to claim 1.

The method the following steps:
  providing a descaling device comprising a descaling-chemicals reservoir for containing liquid descaling chemicals therein and having a water inlet port, and an outlet port;
  providing a water tank for containing water therein and provided with a bottom connection forming an outlet passage for dispensing water from the water tank to the hydraulic circuit;
  arranging the descaling device inside the water tank and connecting the descaling device to the bottom connection of the water tank;
  either before or after connecting the descaling device to the bottom connection of the water tank, coupling the water tank to the hydraulic circuit, thus establishing a flow connection between the descaling-chemicals reservoir and the hydraulic circuit;
  providing water in the water tank;
  sucking liquid descaling chemicals from the descaling-chemicals reservoir through the outlet port thereof, thus circulating liquid descaling chemicals through the hydraulic circuit, while reducing a pressure in the descaling-chemicals reservoir;
  sequentially sucking water from the water tank through a flow path connecting the water tank with the descaling-chemicals reservoir and through the descaling-chemicals reservoir, thus circulating water through the hydraulic circuit.

With the method according to the invention, the descaling process becomes simpler than in prior art machines, since the phases of descaling and subsequent rinsing of the hydraulic circuit are performed in sequence and without the need for the user's intervention. As a matter of fact, once at least part or the entire descaling chemicals have been caused to flow into the hydraulic circuit, further suction operated by the pump of the hydraulic circuit causes clean water to flow from the descaling device through the hydraulic circuit of the hot-beverage producing machine. All the operator needs to do in order to perform a descaling cycle is thus to connect the descaling device to the machine and arrange a sufficiently large container under the beverage dispensing nozzles wherefrom the spent descaling chemicals first and the rinsing water afterwards will be discharged.

According to a further aspect of the invention, a method of descaling a hydraulic circuit of a hot-beverage producing machine is provided, said hydraulic circuit comprising at least a pump and a water heater. The method comprises the steps of:
- providing a descaling device comprising a descaling-chemicals reservoir for containing liquid descaling chemicals therein and having a water inlet port, an outlet port, a top portion and a bottom portion, the outlet port being arranged at or near the bottom portion and the water inlet port being arranged between the top portion and the bottom portion, and wherein a water flow passage extends from the water inlet port towards the top portion of the descaling-chemicals reservoir;
- providing a water tank for containing water therein;
- establishing a flow connection between the descaling-chemicals reservoir and the hydraulic circuit;
- sucking liquid descaling chemicals from the descaling-chemicals reservoir through the outlet port, thus circulating liquid descaling chemicals through the hydraulic circuit, while reducing a pressure in the descaling-chemicals reservoir, suction of descaling chemicals through the outlet port thus causing a pressure drop in the decaling-chemicals reservoir and consequent suction of water through the water inlet port, the water flow passage and the descaling-chemicals reservoir;
- sequentially sucking water from the water tank through the water inlet port, the water flow passage and the descaling-chemicals reservoir, thus circulating water through the hydraulic circuit.

Contrary to the methods of the current art, the sequence of loading the descaling chemicals in the water tank, descaling the circuit, removing the water tank, washing and rinsing the water tank, filling the water tank with fresh water, re-connecting the water tank to the hot-beverage producing machine and causing water to rinse the hydraulic circuit becomes unnecessary. Since the intervention of the user during the descaling/rinsing process is not necessary anymore, the entire process can be performed without the user being present, e.g. at night time.

According to a further aspect, the invention concerns a descaling device for descaling a hydraulic circuit of a hot-beverage producing machine according to claim 2.

The descaling device comprises:
- a descaling-chemicals reservoir provided with: a top portion; a bottom portion, configured for coupling to a bottom connection of a water tank; an outlet port arranged at or near the bottom portion and having an openable closure member for establishing a flow connection of the descaling-chemicals reservoir with a hydraulic circuit of a hot-beverage producing machine;
- a water inlet port;
- a water flow passage for flow communication between the water inlet port and the descaling-chemicals reservoir;
- wherein the water inlet port and the outlet port can be placed in fluid communication, such that water can be sucked through the water inlet port, caused to flow through the descaling-chemicals reservoir and discharged through the outlet port.

The water inlet port can be arranged between the top portion and the bottom portion of the descaling-chemicals reservoir, preferably near or at the bottom portion thereof. The water flow passage can extend from the inlet port towards the top portion of the descaling-chemicals reservoir. The water inlet port and the outlet port of the descaling device are placed in fluid communication through the water flow passage and the descaling-chemicals reservoir, such that water can be sucked through the inlet port, caused to flow through the descaling-chemicals reservoir and discharged through the outlet port upon activation of the pump of the hydraulic circuit provided in the hot-beverage producing machine.

Upon starting of the descaling cycle, the pump in the hot-beverage producing machine will firstly suck liquid descaling chemicals from the descaling-chemicals reservoir through the hydraulic circuit of the hot-beverage producing machine. Due to the descaling chemicals flowing from the descaling-chemicals reservoir, a pressure drop will be generated in the descaling-chemicals reservoir, sufficient to generate a suction effect between the descaling-chemicals reservoir and the water inlet port. The suction effect will cause the water level in the water flow passage to lift until reaching an aperture near the top portion of the descaling-chemicals reservoir, wherefrom water flows into and through the descaling-chemicals reservoir and therefrom in the hydraulic circuit of the hot-beverage producing machine. The water thus washes and rinses the descaling-chemicals reservoir and the hydraulic circuit, roving chemical residues therefrom.

According to a further aspect of the invention, a descaling device for descaling a hydraulic circuit of a hot-beverage producing machine is provided, comprising: a descaling-chemicals reservoir provided with: a top portion; a bottom portion; an outlet port having an openable closure member for establishing a flow connection of the descaling-chemicals reservoir with a hydraulic circuit of a hot-beverage producing machine; a water inlet port; a water flow passage for flow communication between the water inlet port and the descaling-chemicals reservoir; wherein the outlet port is arranged at or near the bottom portion and the water inlet port is arranged between the top portion and the bottom portion; wherein the water flow passage extends from the water inlet port towards the top portion; and wherein the water inlet port and the outlet port can be placed in fluid communication, such that water can be sucked through the water inlet port, caused to flow through the descaling-chemicals reservoir and discharged through the outlet port, such that suction of descaling chemicals through the outlet port causes a pressure drop in the decaling-chemicals reservoir and consequent suction of water through the water inlet port, the water flow passage and the descaling-chemicals reservoir.

The quantity of liquid descaling chemicals in the descaling-chemicals reservoir will gradually diminish and finally only water will flow through the descaling-chemicals reservoir and the hydraulic circuit of the hot-beverage producing machine, thus rinsing the circuit and removing residual descaling chemicals therefrom. The water flow will continue until the water level in the water tank reaches the inlet aperture of the descaling device. At this point the descaling chemicals have been removed from the hydraulic circuit.

In the context of the present description and appended claims, the terms "top" and "bottom", or "up" and "down" are referred to the position of the descaling device when in use. Thus, the top portion is the portion of the descaling device which is in the upper position upwards when the descaling device is connected to the beverage producing machine. Similarly, the bottom portion is the portion which is in the lower position when the descaling device is connected to the beverage producing machine.

According to some embodiments, the water inlet port can be arranged in an intermediate position between the top portion and the bottom portion of the descaling device. However, according to preferred embodiments, the water inlet port is arranged nearer to the bottom portion than to the top portion of the descaling device and preferably adjacent to the bottom portion of the descaling-chemicals reservoir. As will become apparent from the following detailed description of embodiments of the invention, arranging the water inlet port in the bottom most position allows to use most of the water contained in the water tank of the beverage producing machine whereto the descaling device is connected.

In some embodiments, e.g. when the descaling device is a disposable single use device, the closure member arranged at the outlet port of the device can comprise a rupturable element, which can be ruptured to open the outlet port. Rupture can be caused e.g. by a perforator, piercer or cutter suitably located e.g. at the bottom of the water tank where the descaling device is placed.

In other embodiments, e.g. when the descaling device is designed for multiple uses, rather than as a disposable device, the closure member can be designed for repeated uses, i.e. it can provide for reversible opening and closing operations. In some embodiments, the closure member can comprise, for instance, a closing valve with a shutter. The closing valve can be opened upon connection of the descaling-chemicals reservoir to a hydraulic circuit of a beverage producing machine.

When the descaling device is designed for repeated use, it can comprise a filling aperture for filling the descaling-chemicals reservoir with liquid descaling chemicals before use. The filling aperture is advantageously provided with an air-tight closing stopper, such that during use, suction of the descaling chemicals from the descaling-chemicals reservoir causes water to be sucked through the water inlet port and to flow into and through the descaling-chemicals reservoir.

In some embodiments the descaling device can be pre-filled with a predetermined amount of descaling chemicals and sealed. An openable separation member can be arranged between the water inlet port and the descaling-chemicals reservoir to prevent descaling chemicals from exiting the descaling-chemicals reservoir towards the water inlet port. The separation member is opened before starting a descaling cycle using the descaling device. For instance, the separation member can be a removable o rupturable membrane, partition, wall or diaphragm.

The descaling device can be provided with its own water tank, configured for connection to the hydraulic circuit of a hot beverage producing machine. The descaling device can be integrated in the water tank. For instance, a re-usable descaling device can be stably connected to a water tank, which is interfaced with the beverage producing machine when a descaling cycle must be performed. The user can fill the descaling-chemicals reservoir of the descaling device with the descaling chemicals and the water tank with fresh water and then connect the water tank and descaling device to the beverage producing machine. In other embodiments, the descaling device can be separate or removable from the water tank.

In preferred embodiments the descaling device is designed for connection with a standard water tank, the beverage producing machine is equipped with by its own.

According to yet a further embodiment, the descaling device can comprise a water container, fluidly connectable with the descaling-chemicals reservoir through the water inlet port. A closure member can be arranged at the water inlet port and can be designed and configured such that said closure member will open when pressure in the descaling-chemicals reservoir drops, thus placing the water container in fluid communication with the descaling-chemicals reservoir and allowing water to flow through the descaling-chemicals reservoir and the hydraulic circuit.

According to a further aspect, the invention concerns a hot-beverage producing machine comprising: a water tank; a hydraulic circuit comprised of a water heater, a pump and a connection of the hydraulic circuit to the water tank; and a descaling device as defined above, which can be connected to the bottom outlet of the water tank.

The water tank has a bottom connection forming a water outlet passage, said bottom connection being configured and arranged for connecting the descaling-chemicals reservoir to the water outlet passage and forming a flow connection between the descaling-chemicals reservoir and the hydraulic circuit of the hot-beverage producing machine.

Further features and advantages of the invention are set forth in the following description of exemplary embodiments thereof and in the enclosed claims, which form an integral part of the present description.

BRIEF DESCRIPTION OF THE DRAWINGS

A more complete appreciation of the invention and many of the advantages thereof will be readily obtained as the same becomes better understood by reference to the following detailed description when considered in connection with the accompanying drawings, which show one exemplary non-limiting embodiment of the invention. In the drawings.

DETAILED DESCRIPTION OF EMBODIMENTS

The following detailed description of exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

In the following description reference will be made to the application of the descaling device according to the present invention to an espresso or coffee producing machine. It shall, however, be understood that the same invention can be applied to any other hot-beverage producing machine where simplification of the decaling cycle is desired or required.

Figure 1:
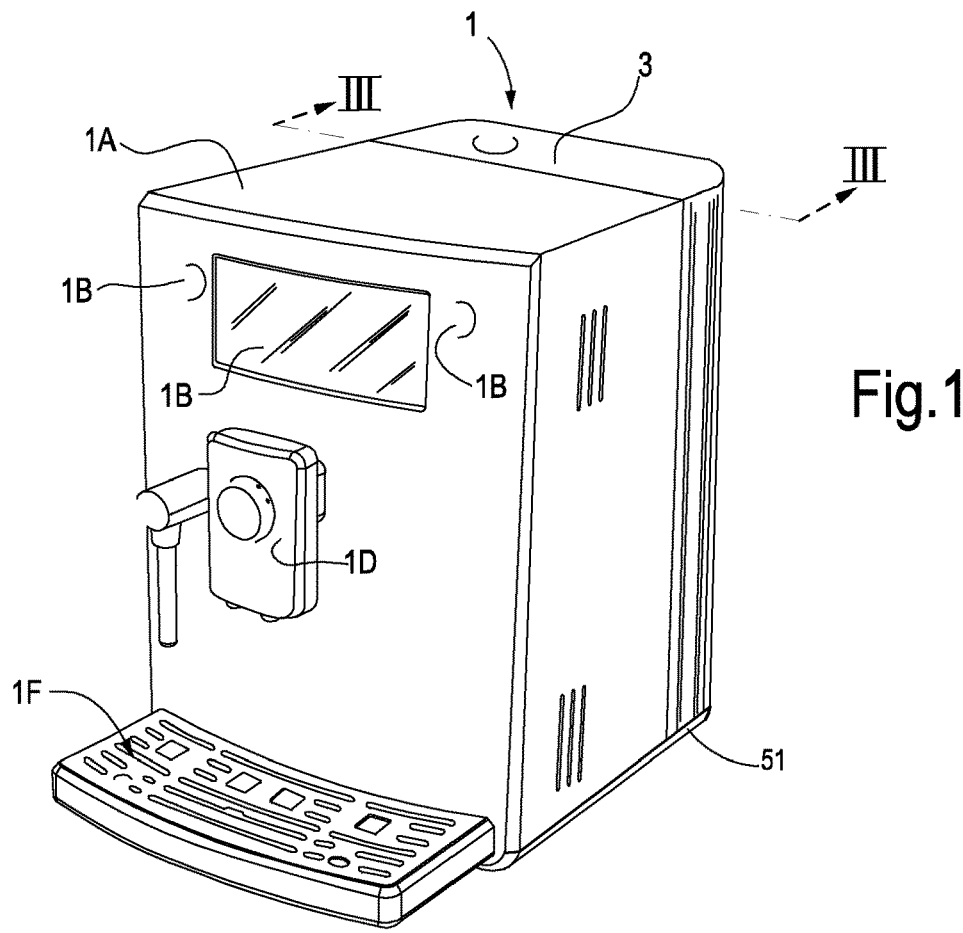
FIG. 1 illustrates a perspective view of a coffee-producing machine, wherein the invention can be embodied.

FIG. 1 schematically illustrates an espresso producing machine designated 1 as a whole. Coffee producing machine 1 comprises a body 1A with a front side where a coffee-dispensing nozzle arrangement 1D and a steam nozzle 1C are arranged. A user-interface panel and operating buttons 1B can also be provided on the front face of the body 1A. A grid 1F is arranged under the coffee-dispensing nozzle arrangement 1D for receiving a cup or the like, wherein the coffee can be dispensed through the coffee-dispensing nozzle arrangement 1D.

Figure 2:
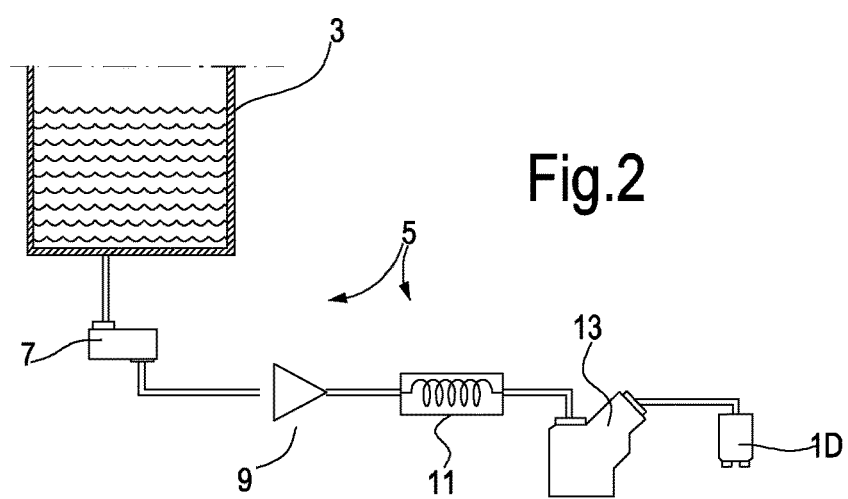
FIG. 2 schematically illustrates a hydraulic circuit of the machine of FIG. 1.

The coffee machine 1 is further provided with a water tank 3, wherefrom water is sucked by a water pump, pressurized and circulated through a hydraulic circuit 5, schematically shown in FIG. 2.

In some embodiments the hydraulic circuit 5 is comprises of a flow meter 7, a water pump 9, a water heater 11, an infusion or brewing unit 13 and relevant water and beverage circulation ducts or pipes. The brewing unit 13 is in fluid communication with the coffee-dispensing nozzle arrangement 1D.

Cold water is pumped by the water pump 9 from the water tank 3 and pumped through the water heater 11. Hot water from the water heater 11 is then delivered through the infusion or brewing unit 13, where the hot beverage is produced. The infusion or brewing unit 13 can be any suitable unit for the preparation of a beverage, as well known to those skilled in the art. Hot beverage from the brewing unit 13 is delivered through the coffee-dispensing nozzle arrangement 1D in a cup positioned on the grid 1F.

During use scale is deposited on the hot parts of the hydraulic circuit 5, in particular in the water heater 11.

In some embodiments the water heater can be a so-called flow-through water heater or instant water heater, wherein water circulates through a pipe which is in thermal contact with a resistor. When a beverage-producing cycle is started, water flows through the pipe of the flow-through heater and is instantly heated at the required temperature due to heat transmitted by the resistor through the wall of the water pipe. Scale deposits form on the inner surface of the water pipe, reducing the cross section of the pipe and thus the head loss across the heater, and reducing the heat transmission efficiency, due to the limited heat transmission coefficient of the scale deposit.

In other embodiments the water heater can comprise a water vessel with a water inlet and a water outlet, as well as at least one resistor arranged inside the water vessel. Water is heated by the resistor and dispensed from the water vessel when requested, during a beverage-producing cycle. In this kind of water heaters, scale deposits form on the walls of the water vessel as well as on the outer surface of the resistor, reducing the resistor efficiency.

Irrespective of the kind of heater used, the hydraulic circuit 5 requires descaling from time to time. The frequency with which descaling must be performed depends mainly from the hardness of the water used.

According to the invention, a descaling device is provided, for use in combination with the water tank 3 of the coffee machine 1, or in combination with a dedicated water tank, different from the water tank 3 of the coffee machine 1. In the following description and the enclosed drawings an embodiment will be disclosed, wherein the descaling device is used in combination with the water tank 3 of the coffee machine 1.

Figure 3A:
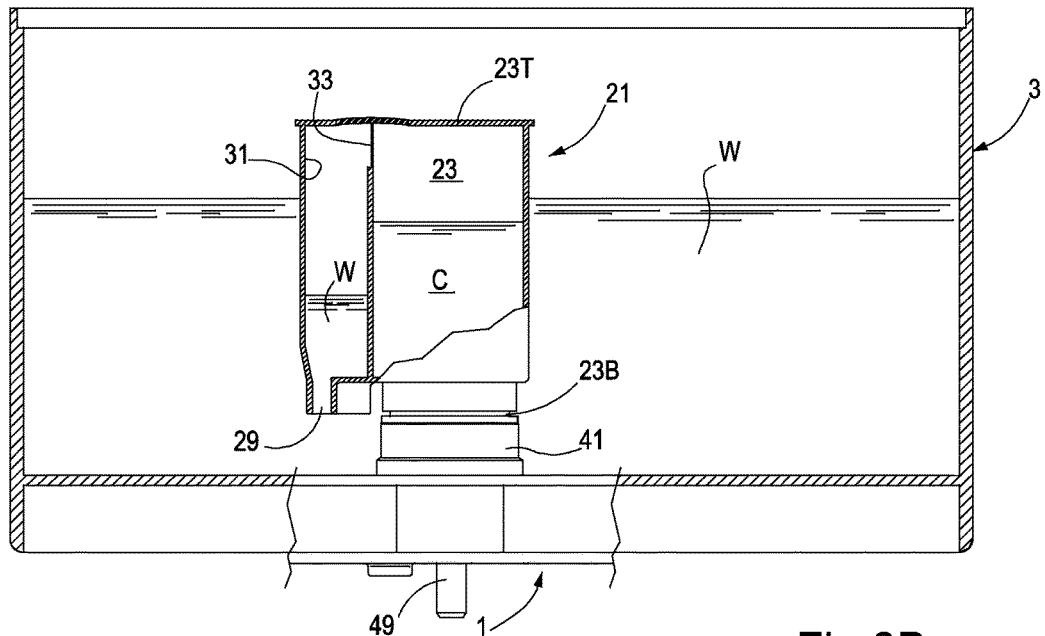
FIGS. 3A-3D illustrate a descaling device according to the invention and the steps of a method of using said device.
Figure 4:
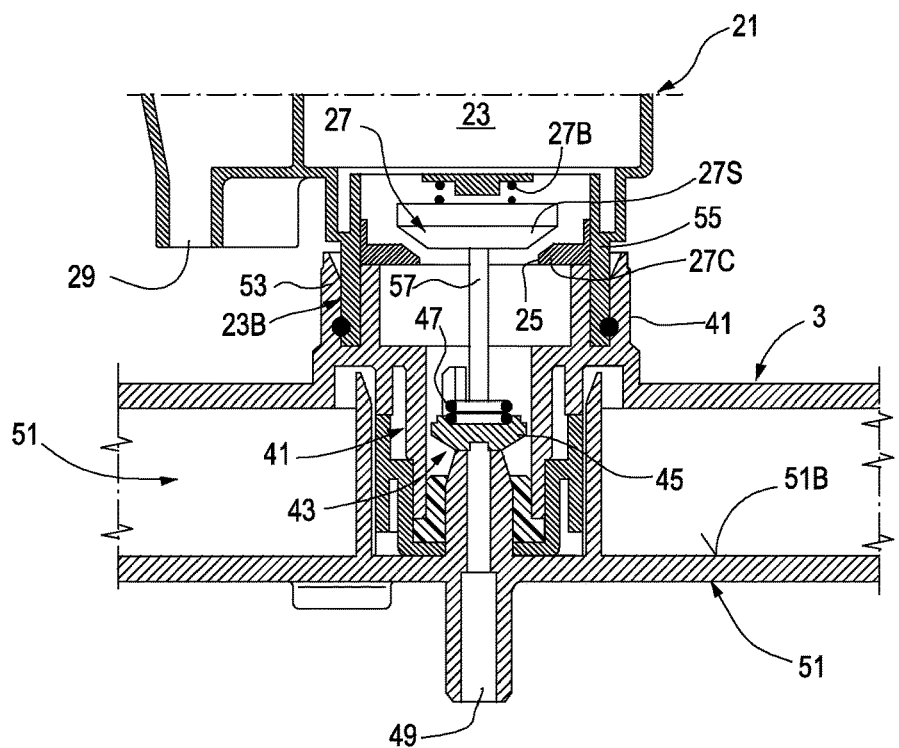
FIG. 4 illustrates an enlargement of a detail of FIGS. 3A-3D.

Referring in particular to FIGS. 3A and 4, in some embodiments a descaling device 21 is provided, which comprises a descaling-chemicals reservoir 23 having a top portion 23T and a bottom portion 23B. As best shown in FIG. 4, the bottom portion 23B of the descaling-chemicals reservoir 23 comprises an outlet port 25. In some embodiments the outlet port 25 can be provided with a closing valve 27 having a shutter 27S biased by an elastic member, e.g. a spring 27B, against a closure seat 27C. Under the elastic action of the spring 27B the shutter 27S closes the outlet port 25 when the descaling device 21 is not connected to the water tank 3 and/or to the hydraulic circuit 5 of the coffee machine 1. In use the descaling device 21 is introduced in the water tank 3 and attached to the bottom of the water tank 3. The descaling-chemicals reservoir 23 is thus fluidly coupled to the hydraulic circuit 5 of the beverage producing machine 1 through the outlet port 25. When the descaling device 21 is connected to the water tank 3, as shown in FIG. 4, the valve 27 will open placing the descaling-chemicals reservoir in fluid communication with the hydraulic circuit 5 of the coffee machine 1, as will be disclosed in greater detail here below.

The descaling device further comprises a water inlet port 29. In some embodiments the water inlet port 29 is arranged between the top portion and the bottom portion of the descaling-chemicals reservoir and preferably adjacent the bottom portion thereof, i.e. nearer to the bottom portion 23B than to the top portion 23T.

In some embodiments, a flow passage 31 extends from the water inlet port 29 towards the top portion 23T of the descaling-chemicals reservoir. The embodiments illustrated in FIGS. 3A-4 the flow passage 31 is separated from the very descaling-chemicals reservoir 23 by a rupturable or removable partition wall 33. In this manner, descaling chemicals C contained in the descaling-chemicals reservoir will be preserved inside the descaling-chemicals reservoir 23 and will be prevented from exiting such reservoir on the one side by the partition wall 33 and on the other side by the valve 27.

When the descaling device 21 is used, the partition wall 33 is ruptured so that a flow path is established between the flow passage 31 and the descaling-chemicals reservoir 23. As mentioned above, connection of the descaling device 21 to the water tank 3 will also cause the valve 27 to open so that a communication will be established between the water inlet port 29 and the hydraulic circuit 5 of the coffee machine through the outlet port 25 when the water tank 3 is connected to said hydraulic circuit.

In FIG. 4 an enlargement of the bottom portion 23B of the descaling-chemicals reservoir 23 is shown in a cross section and in a condition where the descaling device 21 is connected with the water tank 3 and the latter is connected to the coffee machine 1.

In this embodiment the water tank 3 is provided with a bottom connection 41, forming a water outlet passage through which water and descaling chemicals can flow into the hydraulic circuit 5 of the coffee machine 1. A valve 43 comprised of a stopper or shutter 45 biased by a spring 47 is arranged in the bottom connection 41 of the water tank 3. In some embodiments, an upwardly projecting duct 49 extends from a bottom 51B of a seat 51 of the coffee machine wherein the water tank 3 is introduced. The upwardly projecting duct 49 co-acts with the shutter 45 of valve 43 when the water tank 3 is place in the seat 51 of the coffee machine 1. This causes the shutter 45 to lift against the elastic force of the spring 47, thus opening the valve 43 and establishing a connection between the water tank 3 and the hydraulic circuit 5 of the coffee machine 1 which is in fluid communication with the duct 49.

The bottom connection 41 of water tank 3 also forms a seat 53 where the descaling device 21 can be connected, such that the descaling-chemicals reservoir becomes attached with the bottom portion 23B thereof to the bottom connection. The outlet port 25 of the descaling-chemicals reservoir 23 can thus be placed in fluid communication through the bottom of the water tank 3 with the hydraulic circuit of the beverage producing machine. More specifically, in some embodiments the bottom portion 23B of the descaling-chemicals reservoir 23 comprises a collar 55 projecting from the descaling device 21 and forming the bottom portion 23B of the descaling-chemicals reservoir 23, said collar 55 being received into seat 53 so as to provide a fluid connection between the descaling-chemicals reservoir 23 and the bottom connection 41 of the water tank 3 and therethrough with the hydraulic circuit 5 of the beverage producing machine 1.

In some embodiments a fixed pusher 57 arranged in the water outlet passage formed by the bottom connection 41 of the water tank 3 co-acts with the shutter 27S of the valve 27, lifting the stopper 27 as against the biasing force of the spring 27B, thus lifting the stopper 27S from the seat 27C of valve 27, so that the interior of the descaling-chemicals reservoir 23 will be placed in fluid communication, through the water outlet passage formed by the bottom connection 41, with the duct 49 and there through with the hydraulic circuit 5 of the coffee machine 1.

Turning now to FIG. 3A, once the descaling device 21 has been connected to the seat 53 provided in the bottom of the water tank 3, and the water tank 3 has been filled with water W, and connected with the hydraulic circuit 5 of the coffee machine 1, the descaling cycle can start, once the rupturable partition wall 33 has been ruptured or opened, so as to establish a flow connection between the water inlet port 29 and the outlet port 25 of the descaling device 21.

Figure 3B:
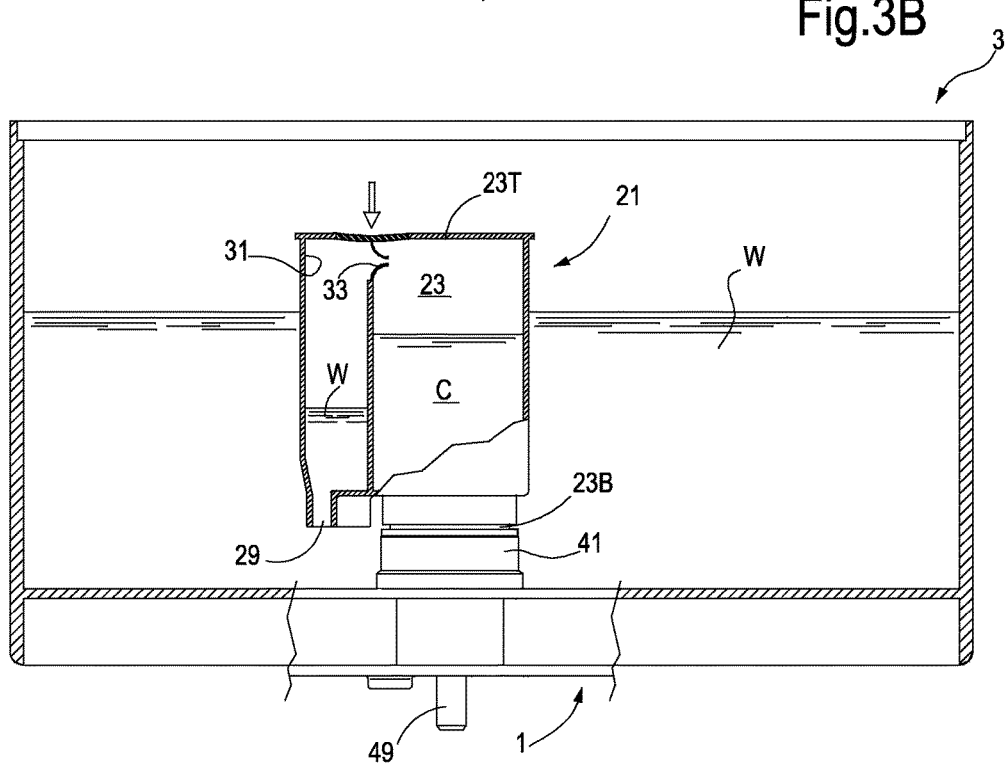

In FIG. 3B the partition wall 23 has been ruptured. This can occur, for example, by providing a flexible top portion 23T, which can be deformed by pushing from above in correspondence of the rupturable wall 33 until the latter breaks. The partition wall 33 can be designed also in other ways, provided it can be opened, ruptured or broken before starting the descaling cycle.

For example, the partition wall 33 can be entirely or partly movable from the exterior of the descaling device 21, for instance providing a sliding portion of the partition wall 33 which can be operated through a tongue or any other operating member which can be activated by the user from the exterior of the descaling device.

Once the partition wall 33 has been ruptured or opened in any other way to establish a flow communication between the water inlet port 29 and the outlet port 25, the water level in the flow passage 31 will slightly raise as shown in FIG. 3B. Pressure inside the descaling-chemicals reservoir 23 prevents, however, the level of the water from reaching the aperture generated by removal or rupture of the partition wall 23 until the pump 9 of the hydraulic circuit 5 starts pumping.

Figure 3C:
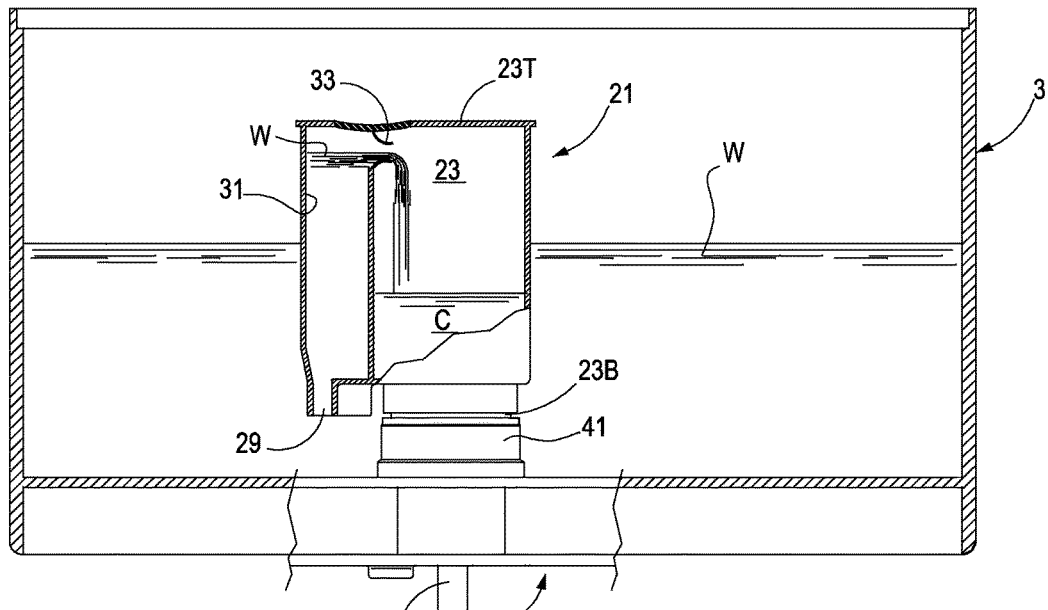

Once the pump 9 is activated, the descaling chemicals will be gradually sucked from the bottom of the descaling-chemicals reservoir 23 and the level of the descaling chemicals C will lower (see FIG. 3C). The pressure reduction caused by sucking the descaling chemicals from the descaling-chemicals reservoir 23 causes the water level in the flow passage 31 to raise until water starts flowing through the aperture formed by breaking or removing the partition wall 33, as shown in FIG. 3C.

Therefore, during the first part of the descaling cycle, undiluted descaling chemicals will be sucked by the pump 9 and circulated through the hydraulic circuit 5. Once the water reaches the level of the aperture formed by the rupture of the partition wall 33, the residual descaling chemicals C will be gradually diluted and diluted chemicals will be pumped in and through the hydraulic circuit 5.

Figure 3D:
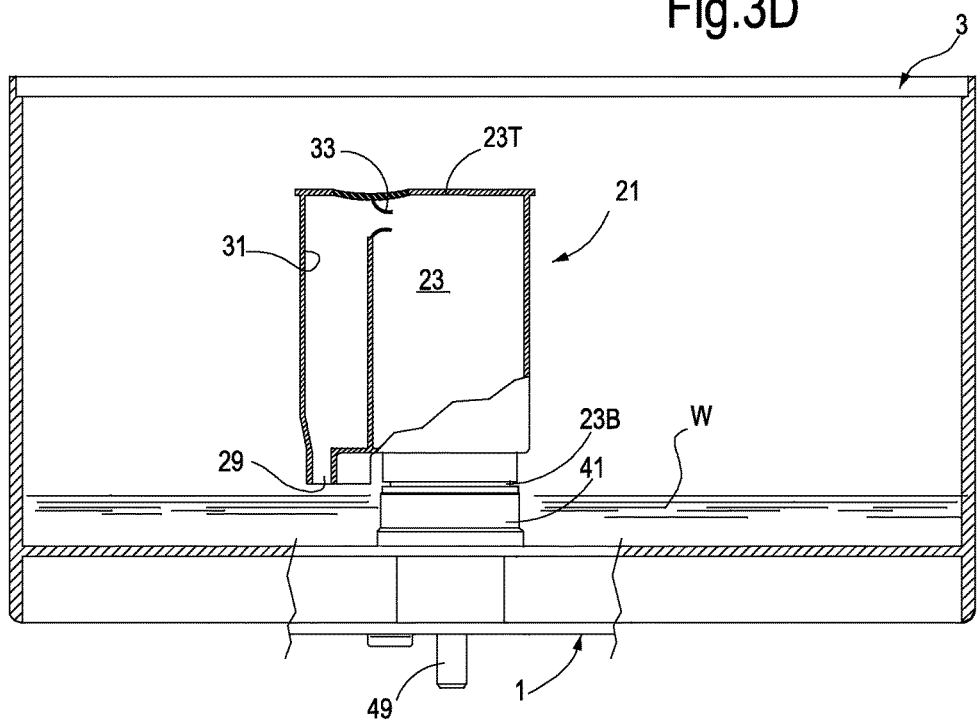

The concentration of the descaling chemicals in the flow pumped by the pump 9 through the hydraulic circuit 5 will continuously reduce until the descaling chemicals have been entirely removed from the descaling-chemicals reservoir 23. From this point onwards, only water will flow through the water passage 31, the descaling-chemicals reservoir 23 and finally through the water outlet 41 of the water tank 3 and the hydraulic circuit 5. The cycle will continue until the water level in the water tank 3 reaches the water inlet port 29 as shown in FIG. 3D. At this point the pump 9 will stop.

As can be understood from the above description, during the descaling cycle the chemical composition of the liquid flowing through the hydraulic circuit 5 changes from undiluted descaling chemicals at the beginning of the cycle to pure water at the end of the cycle. Since the amount of water contained in the water tank 3 is considerably larger than the amount of the liquid descaling chemicals contained in the descaling device 21, at the end of the cycle, when the water level in the water tank 3 has reached the water inlet port 29, the entire hydraulic circuit 5 will be cleaned and any residues of descaling chemicals will be removed.

The entire cycle described above can be performed automatically, without the need of an operator being present, since replenishing of the water tank 3 is not required and washing of the hydraulic circuit with fresh water is performed automatically and sequentially after exhaustion of the descaling chemicals.

In some embodiments, the outlet port 25 of the descaling-chemicals reservoir 23 can be closed by a rupturable sealing or closing member, such as a membrane or film, rather than by a valve 27 with a stopper 27S, thus making the device 21 simpler and less expensive.

Figure 5:
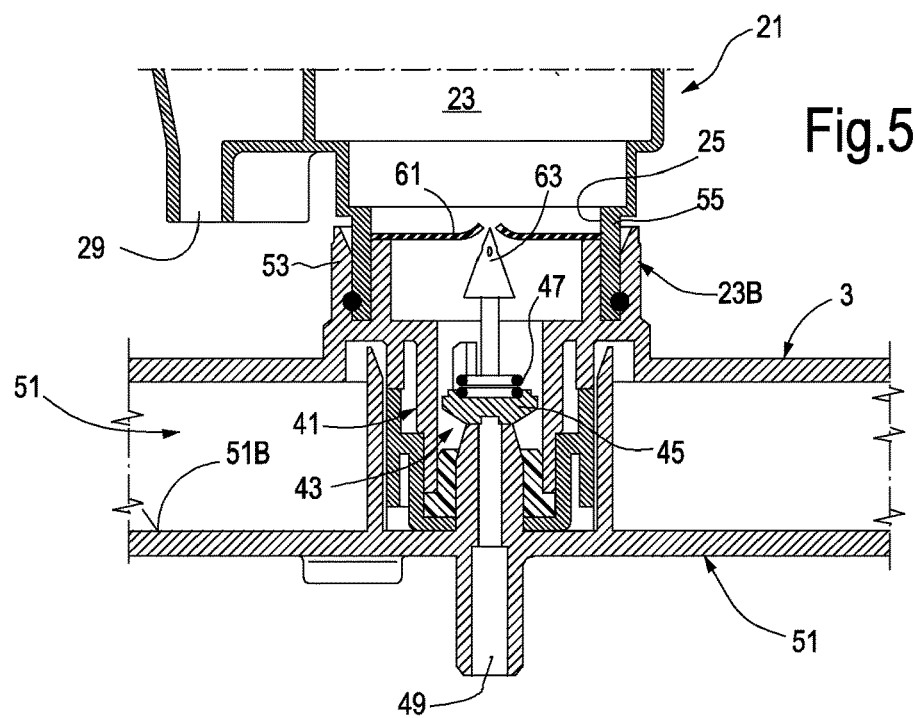
FIG. 5 illustrates an enlargement similar to FIG. 4 of a modified embodiment of the device according to the invention.

For instance, in the embodiment shown in FIG. 5 a closure member in the form of a pierceable or rupturable membrane 61 is provided for closing the outlet port 25 of the descaling-chemicals reservoir 23. The water tank 3 can be provided with a piercer 63 which pierces or breaks the membrane 61 when the descaling device 21 is fitted into the seat 53 at the bottom of the water tank 3.

The descaling device 21 can be a disposable unit usable only once. The descaling-chemicals reservoir 23 will be filled with liquid descaling chemicals at the time of manufacturing and the reservoir 23 will be sealed for instance by means of the membrane 61 or any other rupturable or removable closure member, or by a valve 27. After used, the descaling device 21 can be disposed of.

In other embodiments the descaling device 21 can be designed for repeated use, by refilling the descaling 21 with a suitable amount of liquid descaling chemicals each time.

Figure 6:
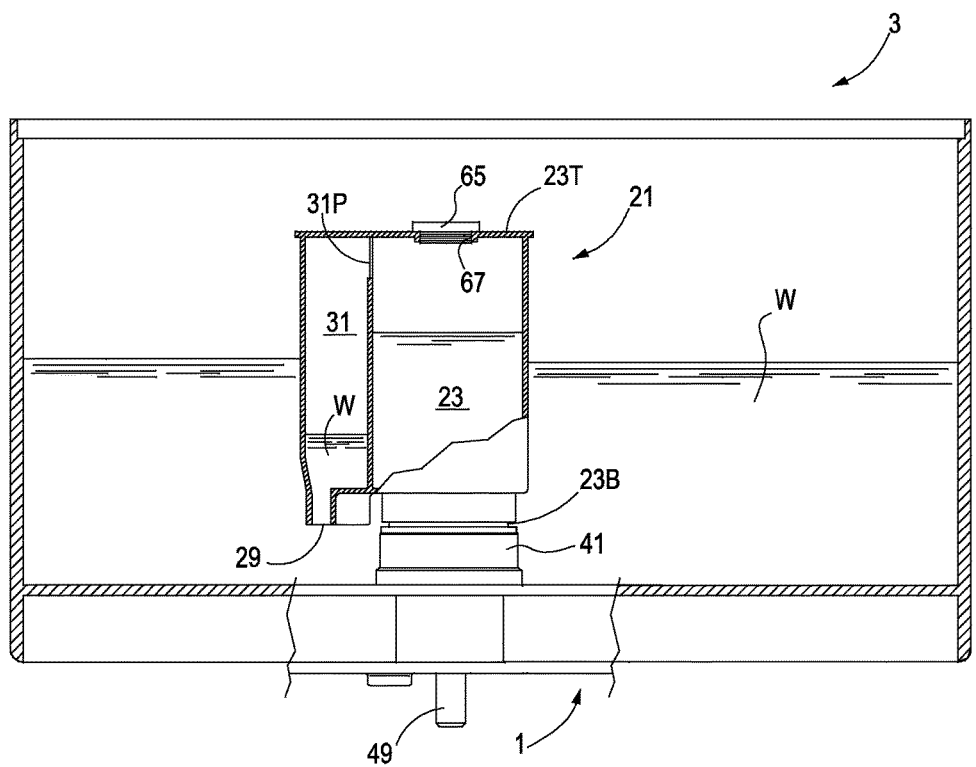
FIG. 6 illustrates view similar to FIGS. 3A-3D in a further modified embodiment of the descaling device.

FIG. 6 schematically illustrates, similarly to FIGS. 3A-3D, a modified embodiment of the descaling device 21, which in this embodiment is designed for repeated use. In some embodiments, the partition wall 33 can be omitted and the flow path 31 can be always in flow communication with the interior of the descaling-chemicals reservoir 23. The bottom of the descaling-chemicals reservoir 23 is closed by a valve 27 similarly to what has been described in connection with FIG. 4.

In the embodiment of FIG. 6 the top portion 23T of the descaling-chemicals reservoir 23 is provided with a removable air-tight closing stopper 65, which can sealingly close an aperture 67 provided in the top portion 23T of the descaling-chemicals reservoir 23.

Use of the descaling device 21 according to the embodiment of FIG. 6 is as follows. The user fits the empty descaling device 21 with the bottom portion 23B of the descaling-chemicals reservoir 23 inside the seat 53 provided in the bottom of the water tank 3. The descaling-chemicals reservoir 23 is subsequently filled with a required amount of descaling chemicals through aperture 67 by removing the air-tight closing stopper 65. Alternatively, the required amount of liquid descaling chemicals can be filled in before fitting the descaling device 21 in the seat 53.

The amount of liquid descaling chemicals filled in the descaling-chemicals reservoir 23 is such that the level of the descaling chemicals will be lower than a communication port 31P between the flow passage 31 and the descaling-chemicals reservoir 23.

Once the desired amount of the descaling chemicals has been placed in the descaling-chemicals reservoir 23 the 65 is put in place and air-tightly closed.

The water tank 3 can be connected to the coffee machine 1, either before or after having connected the descaling device 21 to the water tank 3 and can be filled with the desired amount of fresh water.

The descaling and washing cycle will now be performed quite in the same way as previously described, except that no rupturing of the partition wall 33 is required. Air tight closure of the aperture 67 through the stopper 65 ensures that pumping of the descaling chemicals from the descaling-chemicals reservoir 23 will cause the pressure inside the descaling-chemicals reservoir 23 and the flow passage 31 to drop, so that the water level in the flow passage 31 will raise under the pressure of the water in the water tank 3 surrounding the descaling device 21, quite in the same way as in the previously described embodiment.

The descaling and washing cycle will end up once the descaling chemicals have been entirely sucked out from the descaling-chemicals reservoir 23 and the water from the water tank 3 has been removed, until the water level in the water tank 3 has reached the water inlet port 29.

The embodiments of the descaling devices described so far provide for a descaling-chemicals reservoir which can be connected with the hydraulic circuit of the hot-beverage producing machine and with the interior of a water tank, wherein the device is arranged. Water is sucked from the external water tank through the water inlet port into and through the descaling-chemicals reservoir due to the pressure drop generated in the descaling-chemicals reservoir caused by suction of the descaling-chemicals from the descaling-chemicals reservoir in and through the hydraulic circuit. The pressure drop in the descaling-chemicals reservoir causes the water level to lift along the flow passage until the water fills the flow passage and starts flowing through the descaling-chemicals reservoir.

The hydraulic circuit is thus first subject to a flow of descaling chemicals and subsequently to a flow of gradually thinner descaling-chemicals and water mixture. Since the volume of water in the water tank is comparably larger than the volume of descaling chemicals, the concentration of descaling chemicals will gradually decrease until only water will flow through the descaling-chemicals reservoir and the hydraulic circuit of the hot-beverage producing machine 1. At the end of the descaling process, when the water tank 3 is empty, the hydraulic circuit will be clean, i.e. free of descaling chemicals.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A hot-beverage producing machine comprising:
  a water tank having a water outlet passage;
  a hydraulic circuit including a water heater, a pump, and a connection of the hydraulic circuit to the water tank; and
  a descaling device configured to descale the hydraulic circuit, the descaling device comprising:
    a descaling-chemicals reservoir provided with: a top portion; a bottom portion configured for coupling to a bottom connection of the water tank; an outlet port arranged at or near the bottom portion and having an openable closure member for establishing a flow connection of the descaling-chemicals reservoir with the hydraulic circuit through the bottom connection of the water tank;
    a water inlet port; and
    a water flow passage for flow communication between the water inlet port and the descaling-chemicals reservoir,
    wherein the water inlet port and the outlet port are placed in fluid communication, such that water is sucked through the water inlet port, caused to flow through the descaling-chemicals reservoir and be discharged through the outlet port, and wherein the descaling device in use is located inside the water tank and the bottom connection of the water tank forms the water outlet passage, said bottom connection being configured to connect the descaling-chemicals reservoir to the water outlet passage and to form the flow connection between the descaling-chemicals reservoir and the hydraulic circuit.

2. The hot-beverage producing machine of claim 1, wherein the descaling-chemicals reservoir, the outlet port, and the water inlet port are configured such that at least part of liquid descaling chemicals contained in the descaling-chemicals reservoir is sucked from the descaling-chemicals reservoir generating a pressure drop therein, before water flows into and through the descaling-chemicals reservoir.

3. The hot-beverage producing machine of claim 1, wherein the water inlet port is arranged between the top portion and the bottom portion of the descaling-chemicals reservoir, and wherein the water flow passage extends from the water inlet port towards the top portion of the descaling-chemicals reservoir, such that suction of descaling chemicals through the outlet port causes a pressure drop in the decaling-chemicals reservoir and consequent suction of water through the water inlet port, the water flow passage, and the descaling-chemicals reservoir.

4. The hot-beverage producing machine of claim 1, wherein the water inlet port is arranged adjacent to the bottom portion of the descaling-chemicals reservoir.

5. The hot-beverage producing machine of claim 1, wherein the openable closure member comprises a rupturable element, which is ruptured to open the outlet port.

6. The hot-beverage producing machine of claim 1, wherein the openable closure member comprises a closing valve with a shutter, said closing valve being openable upon connection of the descaling-chemicals reservoir to the hydraulic circuit or to the water tank.

7. The hot-beverage producing machine of claim 1, further comprising a filling aperture for filling the descaling-chemicals reservoir with liquid descaling chemicals, wherein said filling aperture is provided with an air-tight closing stopper.

8. The hot-beverage producing machine of claim 1, wherein an openable separation member is arranged between the water inlet port and the descaling-chemicals reservoir, said openable separation member being opened before starting a descaling cycle using the descaling device.

9. The hot-beverage producing machine of claim 1, wherein a closing valve is arranged at said bottom connection of the water tank, and wherein the closing valve is configured to open upon connection of the water tank to the hydraulic circuit of the hot- beverage producing machine.

10. A hot-beverage producing machine comprising:
 a water tank;
 a hydraulic circuit including a water heater, a pump, and a connection of the hydraulic circuit to the water tank; and
 a descaling device configured to descale the hydraulic circuit, wherein the descaling device comprises:
  a descaling-chemicals reservoir provided with: a top portion; a bottom portion that is configured for coupling to a bottom connection of the water tank; and an outlet port arranged at or near the bottom portion and having an openable closure member for establishing a flow connection of the descaling-chemicals reservoir with the hydraulic circuit through the bottom connection of the water tank, wherein the bottom connection of the water tank forms a water outlet passage, the bottom connection being configured to connect the descaling-chemicals reservoir to the water outlet passage and to form the flow connection between the descaling-chemicals reservoir and the hydraulic circuit, and
 wherein the descaling device is located inside the water tank.

11. The hot-beverage producing machine of claim 10, wherein the descaling device further comprises:
 a water inlet port; and
 a water flow passage for flow communication between the water inlet port and the descaling-chemicals reservoir;
 wherein the water inlet port and the outlet port are placed in fluid communication such that water is sucked through the water inlet port and caused to flow through the descaling- chemicals reservoir and be discharged through the outlet port.

12. The hot-beverage producing machine of claim 11, wherein the descaling-chemicals reservoir, the outlet port, and the water inlet port are configured such that at least part of liquid descaling chemicals contained in the descaling-chemicals reservoir is sucked from the descaling-chemicals reservoir generating a pressure drop therein, before water flows into and through the descaling-chemicals reservoir.

13. The hot-beverage producing machine of claim 11, wherein the water inlet port is arranged between the top portion and the bottom portion of the descaling- chemicals reservoir, and wherein the water flow passage extends from the water inlet port towards the top portion of the descaling-chemicals reservoir, such that suction of descaling chemicals through the outlet port causes a pressure drop in the decaling-chemicals reservoir and consequent suction of water through the water inlet port, the water flow passage, and the descaling-chemicals reservoir.

14. The hot-beverage producing machine of claim 11, wherein the water inlet port is arranged adjacent to the bottom portion of the descaling-chemicals reservoir.

15. The hot-beverage producing machine of claim 11, wherein the openable closure member comprises a closing valve with a shutter, said closing valve being openable upon connection of the descaling-chemicals reservoir to the hydraulic circuit or to the water tank.

16. The hot-beverage producing machine of claim 11, wherein an openable separation member is arranged between the water inlet port and the descaling- chemicals reservoir, said openable separation member being opened before starting a descaling cycle using the descaling device.

17. The hot-beverage producing machine of claim 10, wherein a closing valve is arranged at said bottom connection of the water tank, and wherein the closing valve is configured to open upon connection of the water tank to the hydraulic circuit of the hot-beverage producing machine.

\* \* \* \* \*